(12) United States Patent
Sharma et al.

(10) Patent No.: US 11,899,588 B2
(45) Date of Patent: Feb. 13, 2024

(54) SYSTEMS, METHODS, AND DEVICES FOR DISCARDING INACTIVE INTERMEDIATE RENDER TARGETS

(71) Applicant: Samsung Electronics Co., Ltd., Suwon-si (KR)

(72) Inventors: Anshujit Sharma, Rochester, NY (US); Sushant Kondguli, San Jose, CA (US); Zhenhong Liu, Santa Clara, CA (US); Wilson Wai Lun Fung, Milpitas, CA (US); Arun Radhakrishnan, Austin, TX (US); Wayne Yamamoto, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 64 days.

(21) Appl. No.: 17/175,607

(22) Filed: Feb. 12, 2021

(65) Prior Publication Data

US 2022/0083473 A1 Mar. 17, 2022

Related U.S. Application Data

(60) Provisional application No. 63/078,324, filed on Sep. 14, 2020.

(51) Int. Cl.
*G06F 12/00* (2006.01)
*G06F 12/0875* (2016.01)
(Continued)

(52) U.S. Cl.
CPC ...... *G06F 12/0875* (2013.01); *G06F 12/0269* (2013.01); *G06T 1/20* (2013.01); *G06T 1/60* (2013.01); *G06F 2212/604* (2013.01)

(58) Field of Classification Search
CPC ............. G06F 12/0875; G06F 12/0269; G06F 2212/604; G06T 1/20; G06T 1/60
See application file for complete search history.

(56) References Cited

U.S. PATENT DOCUMENTS 6,003,036 A * 12/1999 Martin ................. G06F 16/283
707/999.005
6,601,153 B1 * 7/2003 Engelbrecht ........... G06F 12/08
707/999.2

(Continued)

OTHER PUBLICATIONS

Anglada, Marti et al., "Rendering Elimination: Early Discard of Redundant Tiles in the Graphics Pipeline", 2019 IEEE International Symposium on High Performance Computer Architecture (HPCA), Mar. 28, 2019, 12 pages.

(Continued)

*Primary Examiner* — Shawn X Gu
*Assistant Examiner* — Mohammad S Hasan
(74) *Attorney, Agent, or Firm* — Renaissance IP Law Group LLP (57) ABSTRACT

A graphics processing unit (GPU) includes a table located in a memory of the GPU and a cache hierarchy. The table contains an address of inactive data in a cache hierarchy of the GPU in which the inactive data is associated with an intermediate render target. The cache hierarchy is responsive to an eviction event by discarding the inactive data from the cache hierarchy without performing a writeback to a system memory associated with the GPU based on the address of the inactive data being contained in the table. The cache hierarchy may obtain the address of the inactive data from the table, and the inactive data may be located in a last-level cache of the cache hierarchy. In one embodiment, the address of inactive data in a cache hierarchy of the GPU includes a range of addresses for the inactive data.

20 Claims, 4 Drawing Sheets (51) Int. Cl.
*G06F 12/02* (2006.01)
*G06T 1/60* (2006.01)
*G06T 1/20* (2006.01)

(56) References Cited

U.S. PATENT DOCUMENTS

| | | | |
|---|---|---|---|
| 6,671,766 B1* | 12/2003 | Vandenbergh | G06F 12/123 |
| | | | 711/134 |
| 8,659,589 B2 | 2/2014 | Lawrence et al. | |
| 9,378,151 B2* | 6/2016 | Agarwal | G06F 12/121 |
| 9,940,026 B2* | 4/2018 | Leidel | G06F 3/0605 |
| 10,235,792 B2 | 3/2019 | Mather et al. | |
| 10,726,519 B2* | 7/2020 | Fielding | G06F 12/0875 |
| 10,762,696 B2 | 9/2020 | Jin | |
| 2002/0184238 A1* | 12/2002 | Chylla | H04N 1/2187 |
| 2005/0057571 A1* | 3/2005 | Stevens | H04N 19/14 |
| | | | 702/182 |
| 2008/0313405 A1* | 12/2008 | Sakata | G06F 12/0822 |
| | | | 711/E12.024 |
| 2010/0235583 A1* | 9/2010 | Gokaraju | G06F 12/0875 |
| | | | 711/E12.07 |
| 2012/0221788 A1* | 8/2012 | Raghunathan | G06F 17/16 |
| | | | 711/E12.001 |
| 2012/0265954 A1* | 10/2012 | Haustein | G06F 3/061 |
| | | | 711/E12.071 |
| 2013/0067186 A1* | 3/2013 | Pronovost | G06F 12/023 |
| | | | 711/170 |
| 2014/0351529 A1* | 11/2014 | Wells | G06F 3/0673 |
| | | | 711/157 |
| 2015/0039835 A1* | 2/2015 | Agarwal | G06F 11/30 |
| | | | 711/133 |
| 2015/0357045 A1* | 12/2015 | Moschiano | G11C 16/26 |
| | | | 714/720 |
| 2016/0357672 A1* | 12/2016 | Deguchi | G06F 12/1009 |
| 2018/0157470 A1* | 6/2018 | Matsuura | G06F 8/30 |
| 2019/0197659 A1* | 6/2019 | Kubota | G06F 17/12 |
| 2019/0392297 A1* | 12/2019 | Lau | G06N 3/04 |
| 2020/0379909 A1* | 12/2020 | Uhrenholt | G06F 12/0831 |
| 2021/0358192 A1* | 11/2021 | Zhang | G06T 15/04 |
| 2022/0138551 A1* | 5/2022 | Marani | G06N 3/08 |
| | | | 706/25 |

OTHER PUBLICATIONS

Wu, Chao et al., "ButterFly: Mobile Collaborative Rendering Over GPU Workload Migration", IEEE INFOCOM 2017—IEEE Conference on Computer Communications, Oct. 5, 2017, 9 pages.

* cited by examiner

SYSTEMS, METHODS, AND DEVICES FOR DISCARDING INACTIVE INTERMEDIATE RENDER TARGETS

CROSS-REFERENCE TO RELATED APPLICATION

This application claims the priority benefit under 35 U.S.C. § 119(e) of U.S. Provisional Application No. 63/078,324, filed on Sep. 14, 2020, the disclosure of which is incorporated herein by reference in its entirety.

TECHNICAL FIELD

The subject matter disclosed herein relates to graphics processing units (GPUs). More particularly, the subject matter disclosed herein relates to a system and a method that discards inactive render-target data without generating a writeback to system memory.

BACKGROUND

In a deferred-rendering GPU architecture, a graphics workload may generate one or more intermediate render targets that are used to create a final displayable image. In some cases, the data associated with an intermediate render target may become inactive and may not be used after the final image is created. Render targets that are no longer used may be referred to as inactive render targets. Some graphics processing unit (GPU) architectures may, nevertheless, write the data of these inactive render targets to main memory for memory ordering and consistency purposes, which may be unnecessary and may use GPU cycles and/or memory bandwidth that may be a premium resource in, for example, a mobile GPU. In some cases, it may be difficult to identify when a particular render target is no longer required by an application or becomes inactive.

SUMMARY

An example embodiment provides a GPU that may include a memory and a cache hierarchy. The memory may stores a table containing an address of inactive data in a cache hierarchy of the GPU in which the inactive data may be associated with an intermediate render target. The cache hierarchy may be responsive to an eviction event by discarding the inactive data from the cache hierarchy without performing a writeback to a system memory associated with the GPU based on the address of the inactive data being contained in the table. In one embodiment, the cache hierarchy may obtain the address of the inactive data from the table. In another embodiment, the address of inactive data in a cache hierarchy of the GPU may include a range of addresses for the inactive data. In one embodiment, a deferred-rendering graphics pipeline may generate data that is associated with the intermediate render target. In one embodiment, data associated with an intermediate render target may be generated during a renderpass operation, and the eviction event may occur at an end of the renderpass operation. In another embodiment, data associated with an intermediate render target may be generated during a subpass operation of a renderpass operation, and the eviction event may occur at an end of the subpass operation. In one embodiment, the inactive data may be located in a last-level cache of the cache hierarchy of the GPU.

An example embodiment provides a GPU that may include a deferred-rending graphics pipeline, a memory, and a cache hierarchy. The deferred-rendering graphics pipeline may generates data that may be associated with an intermediate render target. The memory may store a table containing an address of inactive data in a cache hierarchy of the GP in which, the inactive data may be associated with an intermediate render target. The cache hierarchy may be responsive to an eviction event by obtaining the address of the inactive data from the table and discarding the inactive data from the cache hierarchy without performing a writeback to a system memory associated with the GPU based on the address of the inactive data being contained in the table. In one embodiment, the address of inactive data in a cache hierarchy of the GPU may include a range of addresses for the inactive data. In another embodiment, data associated with an intermediate render target may be generated during a renderpass operation, and the eviction event may occur at an end of the renderpass operation. In still another embodiment, data associated with an intermediate render target may be generated during a subpass operation of a renderpass operation, and the eviction event may occur at an end of the subpass operation. In one embodiment, the inactive data may be located in a last-level cache of the cache hierarchy of the GPU.

An example embodiment provides a method that may include: generating data associated with an intermediate render target in which the data may be located within a cache hierarchy of a GPU; determining that the data associated with the intermediate render target has become inactive; communicating to the cache hierarchy an address in the cache hierarchy of the data associated with the intermediate render target that has become inactive; and discarding the data from the cache hierarchy without performing a writeback to a system memory associated with the GPU. In one embodiment, communicating to the cache hierarchy an address in the cache hierarchy of the data may include storing in a table the address in the cache hierarchy of the data associated with the intermediate render target that has become inactive. In another embodiment, the address in the cache hierarchy of the data associated with the intermediate render target that has become inactive comprises a range of addresses for the data. In one embodiment, discarding the data without performing a writeback to the system memory may include comparing an address of the data in the cache hierarchy to the address in the table of the data associated with the intermediate render target that has become inactive, and discarding the data from a location of the data in the cache hierarchy without performing a writeback to the system memory. In still another embodiment, the data associated with an intermediate render target may be generated in a deferred-rending pipeline of the GPU. In one embodiment, the data may be located in a last-level cache of the cache hierarchy of the GPU. In another embodiment, data associated with an intermediate render target may be generated during a renderpass operation of the GPU, and determining that the data associated with the intermediate render target has become inactive may occur at an end of the renderpass operation. In yet another embodiment, data associated with an intermediate render target may be generated during a subpass operation of a renderpass operation of the GPU, and determining that the data associated with the intermediate render target has become inactive may occur at an end of the subpass operation.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

The subject matter disclosed herein provides a system and a method that identifies and discards inactive data associated with an intermediate render target without generating a writeback operation. Embodiments disclosed herein may include and/or provide any or all of the following features and/or benefits. A driver may identify intermediate render targets based on one or more application programming interface (API) hints. A driver may identify when an intermediate render target becomes inactive based on one or more API hints. A driver may communicate an identity of an inactive render target to GPU hardware by, for example, using a table that contains page addresses belonging to one or more inactive render targets. Upon a cache line eviction of dirty cache line(s), writeback of the data in the cache line may be ignored if the address of the data in the cache line is found in the table of addresses of inactive render targets. In some embodiments, one or more address ranges of inactive render targets may be communicated directly to lower-level caches, and the lower-level caches may discard any data that belong to the inactive render targets. Discarding inactive render targets rather than writing the data of the inactive render target back to system memory may reduce system memory traffic for computer-graphics workloads. Depending on implementation details, discarding data of inactive render targets may improve overall performance (e.g., frames per second (fps)) of workloads that may be bottlenecked by memory bandwidth. Additionally, timely discarding of data of inactive render targets may reduce data movement across a GPU, thereby reducing overall power consumption.

Some embodiments disclosed herein may help hardware identify data associated with intermediate render targets. Identification information may be communicated to GPU hardware by a driver as intermediate render targets are instantiated, and/or as intermediate render targets become inactive during or at the end of a renderpass. The GPU hardware may then communicate the identification information to, for example, a lower-level cache of a cache hierarchy. Upon a cache line eviction of dirty cache lines from the lower-level cache, writeback of data may be avoided if the data in the cache is determined to belong to an inactive render target. In one embodiment, a lower-level cache may invalidate a cache line that belongs to an inactive render target without performing writebacks for a cache line that is dirty. Invalidation of an cache line containing inactive data may be optional and may be delayed until the cache lines are needed by one or more caches and/or, for example, depending on how busy the caches may be at the moment of invalidation. If the address of the data of an evicted cache line does not belong to an inactive render target, a writeback may be performed.

Some graphics APIs may allow programmers an ability to inform GPU hardware that a particular render target may become inactive and, if so, when it is safe to discard the inactive render target. A tiled GPU, for example, may avoid performing a writeback by discarding a tile buffer belonging to the inactive render target. In the absence of a tile buffer, however, the inactive data may be located anywhere in a cache hierarchy and invalidation and/or discard of the inactive data may be difficult. Additionally, render-target data may become inactive before an API hint. Accurately identifying when a render target becomes inactive and discarding inactive data from one or more caches may help conserve system-memory bandwidth of a GPU.

In deferred-rendering architecture, a graphics workload may generate various intermediate render targets and use the intermediate render targets to create a final displayable image. In most cases, the data associated with intermediate render targets may not be used after the final image has been created. Some architectures, however, may write out the intermediate data to system memory in its entirety, thereby consuming valuable system memory bandwidth. The subject matter disclosed herein may help identify scenarios when an intermediate render target is no longer required by an application or becomes inactive and may be safely discarded. Upon identification of such scenarios, a signal may sent to a lower-level cache to discard any data associated with an inactive intermediate render target.

In GPU architecture implementations that do not use tile buffers, intermediate render targets may take the form of transient attachments. A renderpass operation may allocate multiple transient attachments. The transient attachments may be generated and consumed during subpasses of a renderpass, and the validity of a transient attachment may not extend across multiple renderpasses. That is, one or more transient attachments may become invalid at the end of a renderpass, there may be a situation in which one or more of transient attachments may become inactive before the end of a renderpass. Hardware of a GPU, such as a lower-level cache, may use information relating to inactive transient attachments to discard the inactive data rather than initiating an unnecessary writeback operation.

A computer-graphics workload that is being processed by a deferred-rendering pipeline may generate multiple intermediate render targets to create a final displayable image. Frequently, the intermediate render targets are generated solely for the purpose of creating a final frame and are only consumed as the frame is being created. Depending on the API, a graphics workload may enter a special mode, referred to as a renderpass, while generating (drawing) a frame. A renderpass may include multiple subpasses. Examples subpasses may include a Gbuffer, a lighting pass 1, a lighting pass 2, a depth of field (DoF), etc. An output of a subpass may be an intermediate render target that may be used by one or more subsequent subpasses. Once the subpasses for a particular render target have been executed, data associated with that render target may no longer be used by the application and/or any other process that may access memory, and may be considered to be inactive. In some situations, inactive render targets may still be valid for the duration of the renderpass and then becomes truly dead when the renderpass completes execution. Clients and/or applications may not access inactive render targets and the inactive render targets may be treated as having invalid or dead data.

In some embodiments, intermediate render targets may form a significant portion of system memory traffic. Some of the system memory traffic generated by intermediate render targets may be generated to maintain memory ordering for inactive render targets. This type of system memory traffic may be avoided if inactive render targets are identified and discarded rather than being used to generate system memory traffic. In some embodiments, one or more APIs may provide support for an application to indicate to the GPU hardware whether a particular render target is intermediate by the application allocating intermediate render targets as transient attachments within one or more renderpass definitions. In some embodiments, and depending on the implementation details, one or more of the techniques disclosed herein may reduce system memory traffic by, for example, using transient-attachment information to lower retention of soon-to-be-inactive transient attachments in a lower-level cache. In some embodiments, and depending on the implementation details, system memory traffic savings may be obtained, for example, when transient-attachment information is used to discard any writeback traffic of inactive render targets.

Figure 1:
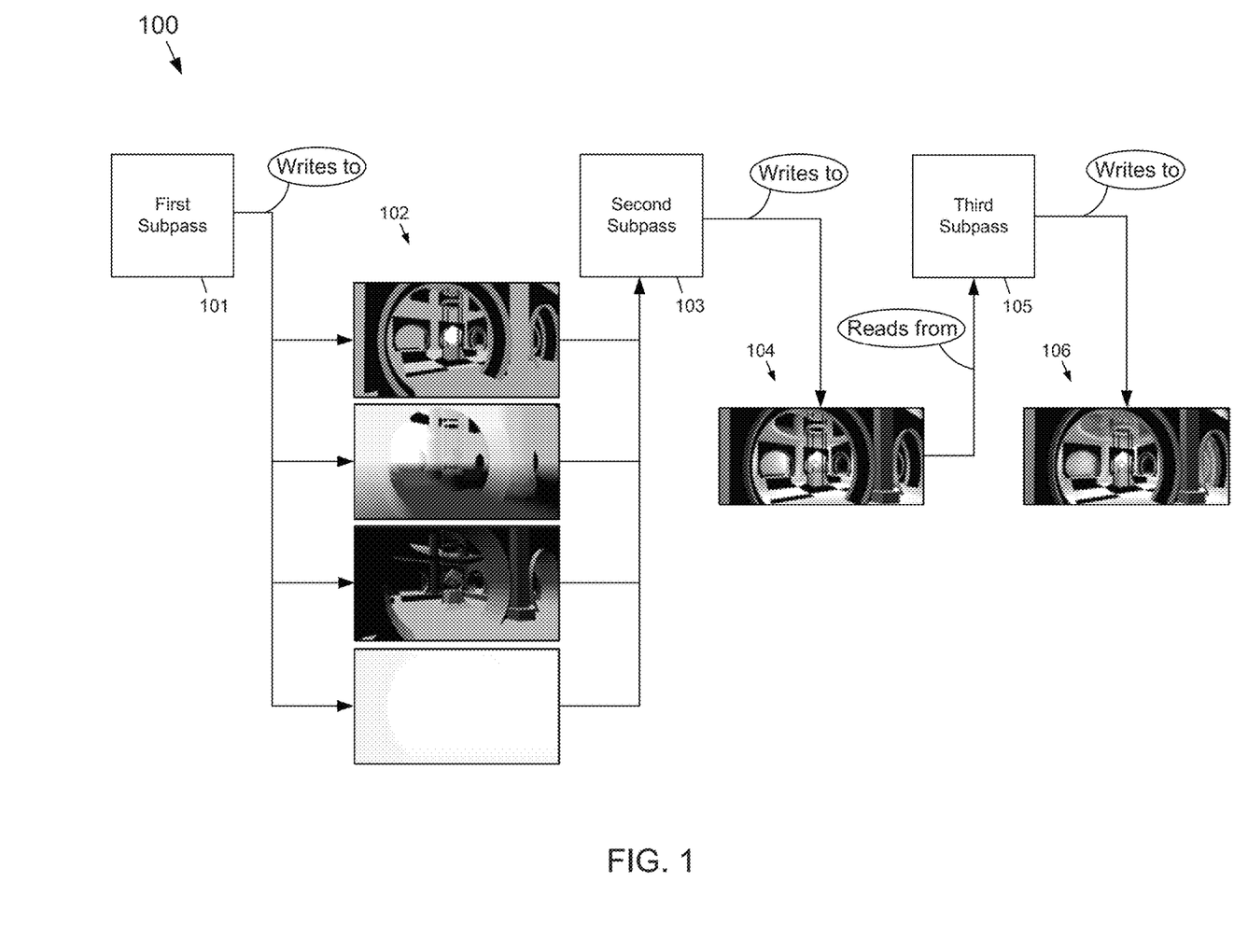
FIG. 1 depicts multiple render targets that may be generated at various subpasses by an example deferred-rendering graphics pipeline.

FIG. 1 depicts multiple render targets that may be generated at various subpasses by an example deferred-rendering graphics pipeline. A first subpass 101 may generate (i.e., write to) intermediate render targets 102. A second subpass 103 may read the intermediate render target data 102 and generate additional intermediate render target data 104. A third subpass 105 may read the intermediate render target data 104 and generate intermediate render target data 106. The intermediate render target data 102, 104 and 106 may travel through an entire caching hierarchy even though it may become inactive before a final image is rendered.

Identifying when an intermediate render target becomes inactive may be accomplished by one or more APIs instructions that may include functionality that identifies when an intermediate render target becomes inactive. In a situation in which a driver may not be able to confidently identify whether a particular transient attachment is inactive, the driver may communicate hint information that to a lower-level cache in the cache hierarchy using, for example, an indication such as a "soon-to-be-inactive" hint. In such a situation, a lower-level cache may still maintain memory ordering by, for example, performing writebacks, but use a lower retention age for data that is hinted by the driver to possibly be inactive. By evicting soon-to-be-inactive data, space in a lower-level cache may be freed for data that may benefit from caching. In some situations, a driver may be able to accurately identify transient attachments at the start of a subpass that may become inactive at the end of the same subpass. Data associated with the transient attachments may be pushed to a least recently used (LRU) position in a lower-level cache when accessed.

In the absence of an ability to identify an inactive render target, data associated with an inactive render target may continue to follow some or all memory ordering rules. Thus, an inactive render targets may generate data traffic across a GPU, which may be unnecessary and may consume power and/or reduce an overall performance of the GPU architecture. Writebacks are known to generate system memory (i.e., DRAM) traffic. Writebacks may be generated when a cache line marked dirty is evicted. If it is known that a particular cache line belongs to an inactive render target, then writeback traffic to system memory may be avoided. In some embodiments under certain conditions, most of the writeback traffic may belong to inactive render targets. Thus, avoiding writebacks for these inactive render targets may result in a savings of system memory traffic.

Figure 2:
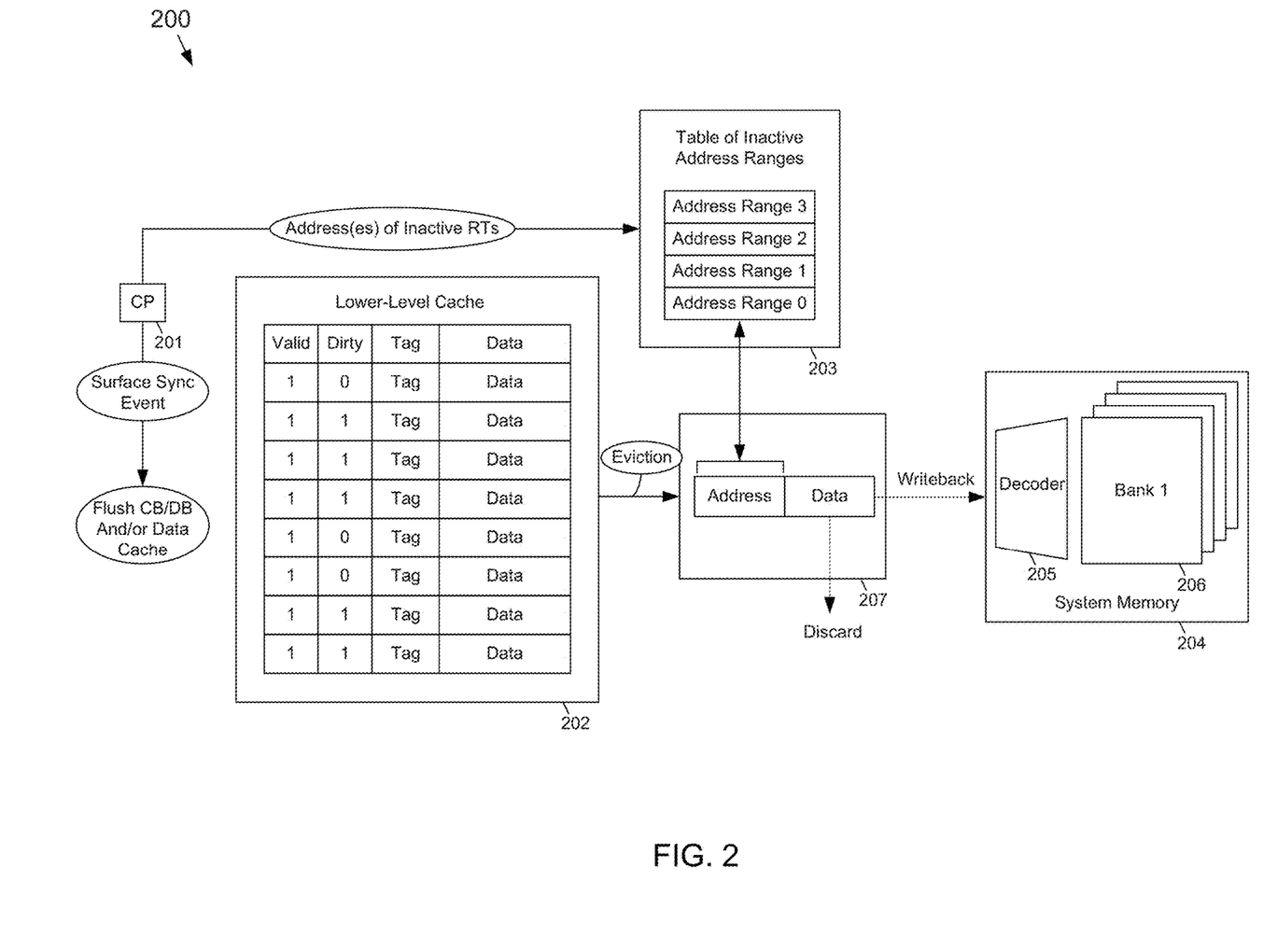
FIG. 2 depicts an example embodiment of a GPU system and the corresponding data flow according to the subject matter disclosed herein.

FIG. 2 depicts an example embodiment of a GPU system 200 and the corresponding data flow according to the subject matter disclosed herein. The system 200 may include a command processor 201, a data cache 202, a table 203 of inactive address ranges (TIAR), and a system memory 204. The command processor 201 may receive and execute API instructions for processing graphical information. The data cache 202 may be part of a cache hierarchy of the GPU system 200. In one embodiment, the data cache 202 may be a last-level cache. The data cache 202 may contain information relating to, but not limited to, whether a cache line is valid, contains dirty data, tag information, and data. The TIAR 203 may contain addresses and/or address ranges of inactive intermediate render targets. In one embodiment, the TIAR 203 may be compressed. The system memory 204 may include a decoder 205 and one or more banks of dynamic random access memory (DRAM) 206. The various components of the GPU system 200 may be embodied as one or more modules that provide the functionality described herein.

In one embodiment, the command processor 201 may communicate to the table 203 addresses and/or address ranges of inactive intermediate render targets based on, for example, hints provided by the API instructions executed by the command processor 201. The command processor 201 may execute an operation that causes a surface synchronization event, in which case, for example, a color buffer (not shown), a depth buffer (not shown) and/or the data cache 202 may be flushed. In response, the address of a cache line that is to be evicted is compared to address (or address ranges) stored in the table 203. In one embodiment, the comparison may be performed by the command processor 201. In another embodiment, the comparison may be performed by separate logic 207, like comparators and/or other logic gates.

If it is determined that an address (or address range) of the data that is to be evicted from the data cache 202 matches an address (or address range) contained in the table 203, a writeback of the data to system memory is not performed, and the data that is to be evicted. If it is determined that the address (or address range) of the data that is to be evicted from the data cache 202 does not match an address (or address range) contained in the table 203, a writeback of the data to system memory is performed.

Figure 3:
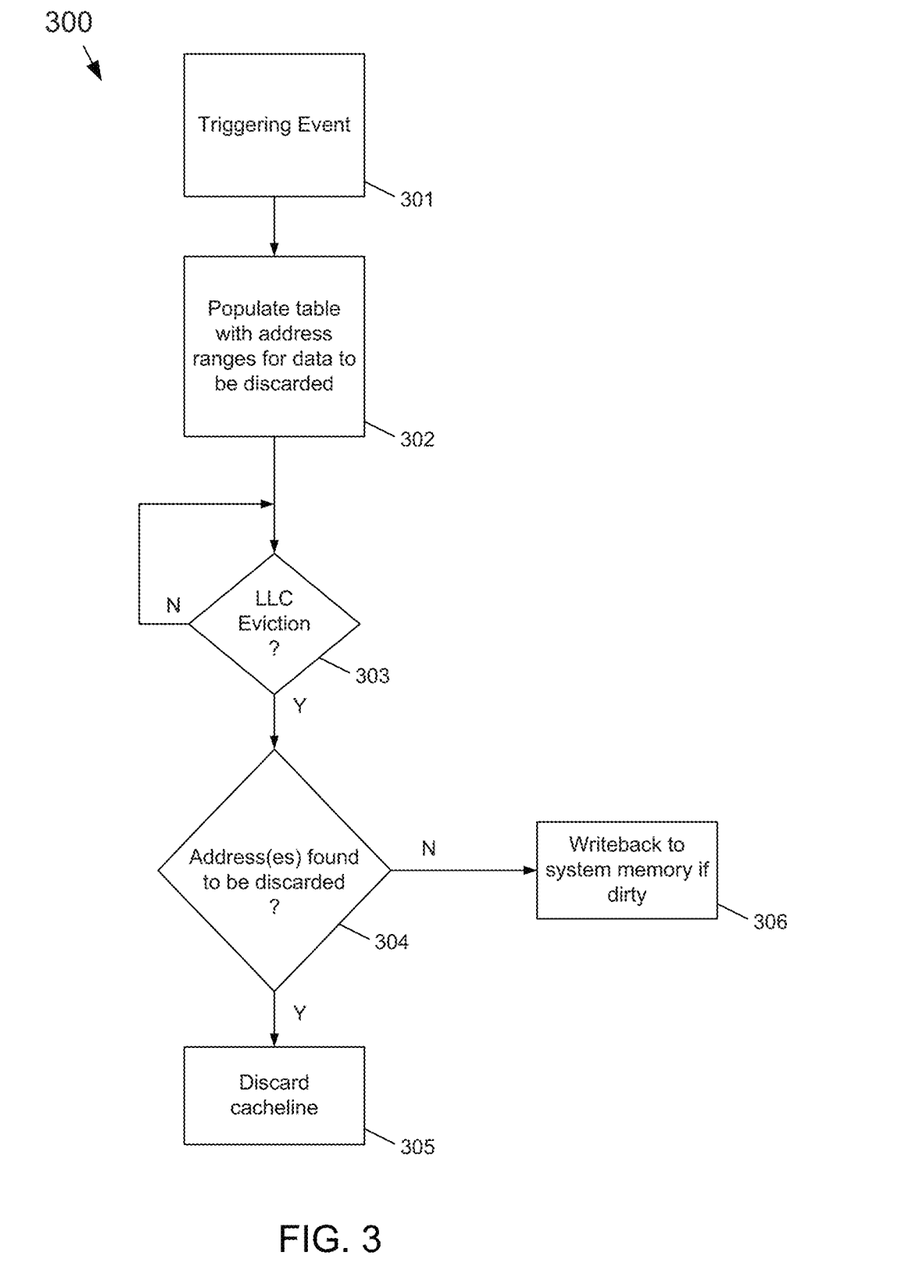
FIG. 3 is an example embodiment of a method that discards data of inactive intermediate render target according to the subject matter disclosed herein.

FIG. 3 is an example embodiment of a method 300 that discards data of inactive intermediate render target according to the subject matter disclosed herein. At 301, a triggering event occurs, such as a surface synchronization event. At 302, a table is populated with addresses (i.e., address ranges) of data of inactive intermediate render targets. In an alternative embodiment, the triggering event at 301 may be based on an API hint. At 303, it is determined whether the triggering event results in, for example, an eviction from a lower-level cache of a cache hierarchy. If not, the flow remains at 303 until, for example, a triggering event causes an eviction from the last-level cache. If, at 303, there is an eviction from a last-level cache, flow continues to 304 where it is determined whether the address(es) of the data of the cache line(s) that are to be evicted are contained in the table of addresses of data of inactive intermediate render targets. If so, flow continues to 305 where the data in the evicted cache line(s) is discarded. Otherwise, flow continues to 306 where the data of the evicted cache line(s) is written back to the system memory if the data is dirty data.

Figure 4:
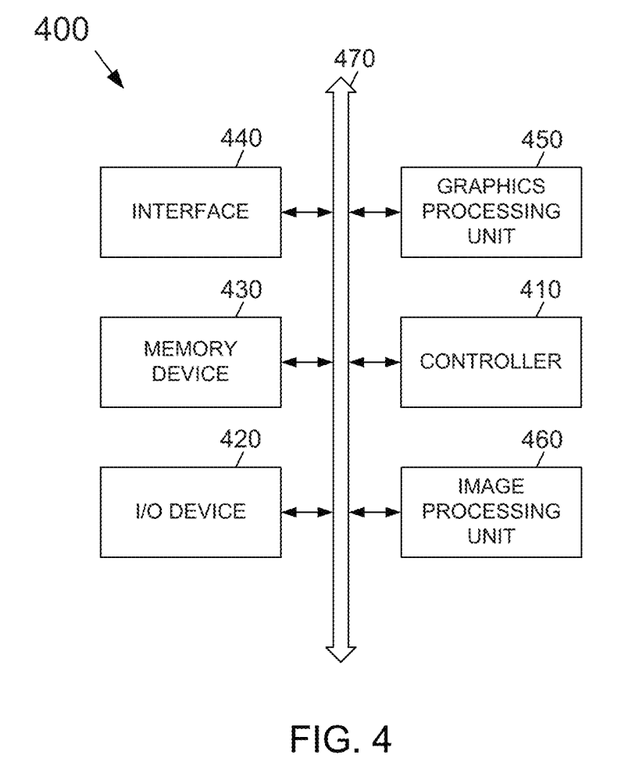
FIG. 4 depicts an electronic device that includes a GPU that discards inactive render-target data according to the subject matter disclosed herein.

FIG. 4 depicts an electronic device 400 that includes a GPU that discards inactive render-target data according to the subject matter disclosed herein. Electronic device 400 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 400 may include a controller 410, an input/output device 420 such as, but not limited to, a keypad, a keyboard, a display, a touch-screen display, a camera, and/or an image sensor, a memory 430, an interface 440, a GPU 450, and an imaging-processing unit 460 that are coupled to each other through a bus 470. The GPU 450 discard inactive render-target data according to the subject matter disclosed herein. The controller 410 may include, for example, at least one microprocessor, at least one digital signal processor, at least one microcontroller, or the like. The memory 430 may be configured to store a command code to be used by the controller 410 or a user data.

Electronic device 400 and the various system components of electronic device 400 may include the image processing unit 460. The interface 440 may be configured to include a wireless interface that is configured to transmit data to or receive data from a wireless communication network using a RF signal. The wireless interface 440 may include, for example, an antenna. The electronic system 400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A graphics processing unit (GPU), comprising:
a cache hierarchy including one or more data caches; and
a memory that stores a table containing an address in system memory of an intermediate render target, in the cache hierarchy, of the GPU,
wherein the cache hierarchy is responsive to an eviction event by discarding inactive data from the intermediate render target in the cache hierarchy without performing a writeback to the system memory associated with the GPU based on the address of the intermediate render target, in the system memory being contained in the table.

2. The GPU of claim 1, wherein the cache hierarchy obtains the address of the intermediate render target from the table.

3. The GPU of claim 2, wherein the address of the intermediate render target in the system memory comprises a range of addresses for the intermediate render target.

4. The GPU of claim 1, wherein a deferred-rendering graphics pipeline generates data that is associated with the intermediate render target.

5. The GPU of claim 4, wherein data associated with the intermediate render target is generated during a renderpass operation, and
wherein the eviction event occurs at an end of the renderpass operation.

6. The GPU of claim 4, wherein data associated with the intermediate render target is generated during a subpass operation of a renderpass operation, and wherein the eviction event occurs at an end of the subpass operation.

7. The GPU of claim 1, wherein the inactive data is located in a last-level cache of the cache hierarchy of the GPU.

8. A graphics processing unit (GPU), comprising:
a deferred-rendering graphics pipeline generates data that is associated with an intermediate render target;
a cache hierarchy including one or more data caches; and
a memory that stores a table containing an address in system memory of an intermediate render target, in the cache hierarchy of the GPU,
wherein the cache hierarchy is responsive to an eviction event by obtaining the address of the inactive data of the intermediate render target from the table and discards the inactive data from the cache hierarchy without performing a writeback to the system memory associated with the GPU based on the address of the intermediate render target, in the system memory being contained in the table.

9. The GPU of claim 8, wherein the address of the intermediate render target in the system memory comprises a range of addresses for the intermediate render target.

10. The GPU of claim 8, wherein data associated with the intermediate render target is generated during a renderpass operation, and
wherein the eviction event occurs at an end of the renderpass operation.

11. The GPU of claim 8, wherein data associated with the intermediate render target is generated during a subpass operation of a renderpass operation, and
wherein the eviction event occurs at an end of the subpass operation.

12. The GPU of claim 8, wherein the inactive data is located in a last-level cache of the cache hierarchy of the GPU.

13. A method, comprising:
generating data associated with an intermediate render target, the data being located within a cache hierarchy of a graphic processing unit (GPU);
determining that the data associated with the intermediate render target has become inactive;
communicating to the cache hierarchy an address in a system memory of the data associated with the intermediate render target; and
discarding the data associated with the intermediate render target from the cache hierarchy without performing a writeback to the system memory associated with the GPU based on the address in system memory of the data associated with the intermediate render target.

14. The method of claim 13, wherein communicating to the cache hierarchy the address in the system memory of the data comprises storing in a table the address in the system memory of the data associated with the intermediate render target that has become inactive.

15. The method of claim 14, wherein the address in the system memory of the data associated with the intermediate render target comprises a range of addresses for the data.

16. The method of claim 14, wherein discarding the data without performing a writeback to the system memory comprises:
comparing the address of the data in the system memory to the address in the table of the data associated with the intermediate render target that has become inactive; and
discarding the data from a location of the data in the cache hierarchy without performing a writeback to the system memory.

17. The method of claim 13, wherein the data associated with the intermediate render target is generated in a deferred-rending pipeline of the GPU.

18. The method of claim 13, wherein the data is located in a last-level cache of the cache hierarchy of the GPU.

19. The method of claim 13, wherein data associated with the intermediate render target is generated during a renderpass operation of the GPU, and
wherein determining that the data associated with the intermediate render target has become inactive occurs at an end of the renderpass operation.

20. The method of claim 13, wherein data associated with the intermediate render target is generated during a subpass operation of a renderpass operation of the GPU, and
wherein determining that the data associated with the intermediate render target has become inactive occurs at an end of the subpass operation.

* * * * *